(Model.)
G. A. SMYTH.
STOPPER FOR BOTTLES, JARS, &c.
No. 248,360. Patented Oct. 18, 1881.
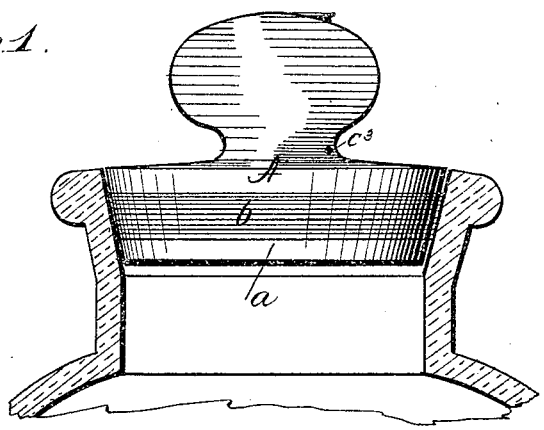
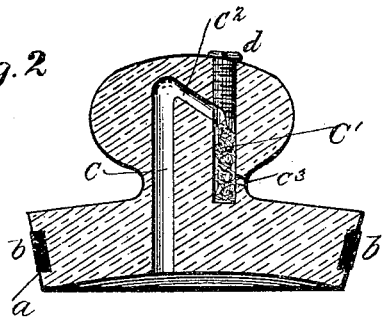
Witnesses.
P. L. Ourand
W. E. Chaffee
Inventor.
George A. Smyth
by Bell, Smith & Co.
Attorneys

UNITED STATES PATENT OFFICE.

GEORGE A. SMYTH, OF NEWPORT, RHODE ISLAND, ASSIGNOR OF SEVEN-ELEVENTHS TO RAPHAEL PUMPELLY, OF SAME PLACE, AND CHARLES F. JOHNSON, JR., OF OWEGO, NEW YORK.

STOPPER FOR BOTTLES, JARS, &c.

SPECIFICATION forming part of Letters Patent No. 248,360, dated October 18, 1881.

Application filed May 19, 1881. (Model.)

*To all whom it may concern:*

Be it known that I, GEORGE A. SMYTH, of Newport, county of Newport, State of Rhode Island, have invented certain new and useful Improvements in Stoppers for Bottles, Jars, &c., of which the following is a full, clear, and exact description, reference being had to the accompanying drawings, making part of this specification, in which—

Figure 1 is a side elevation of my improved stopper applied to the mouth of a jar, shown in section; and Fig. 2 represents a vertical section through the same.

The invention relates to a novel construction of stopper or cover for bottles, jars, &c.; and it consists in providing an ordinary cork, stopper, or cover for such vessels with an air-filter of asbestus or equivalent material, such as will prevent the admission to the vessel of noxious germs, said filter being arranged within the body of the stopper or cover in a sinuous passage or opening extending through the same from the inner to the outer side thereof, and connecting the contents of the vessel with the external air; in a novel arrangement of inclined outlet-openings communicating with said filter for draining it outwardly; and in the combination, with said cork or stopper and aspirating-filter, of a plug for closing the passage through the cork or stopper when required, as hereinafter explained.

In the accompanying drawings, A represents the body of the cork or stopper, which may be of any suitable material, and of a size and form adapting it to fit the bottle, jar, or vessel for which it is intended, and by preference grooved on its periphery at $a$, to receive a packing-ring, $b$, adapting it to fit closely and snugly the mouth of the bottle or jar, and thereby prevent the passage of any air to the contents thereof, except in a manner which will be described. The stopper has two holes or channels formed within it, one, $c$, extending from its lower surface to near its upper surface, and the other, $c'$, extending from the upper surface of the cork or stopper to near its lower surface. These channels overlap each other at their inner ends, as shown, and the one, $c$, opening upon the lower side of the stopper, is connected with the one, $c'$, opening to the external atmosphere by a transverse perforation or channel, $c^2$, extending obliquely downward, by preference, from its upper end, and terminating in the channel $c'$ at or near midway of its length, as shown; and at $c^3$ another hole or perforation is made through the side or handle of the stopper, terminating in the channel $c'$ at or near its lower end, said perforation being also, by preference, made to incline downward from the channel $c'$, adapting it to drain outward. Within the perforation or channel $c'$ is placed a filling of asbestus or equivalent material having the property of filtering microscopic germs from air, after which the open end of the hole or channel is closed by a suitable plug, $d$. The holes or channels in the stopper are made in the peculiar form shown and described, in order, as far as practicable, to exclude moisture from the external air, as it is well understood that water is a vehicle which will carry germs through almost any air filter.

The stopper thus formed may be used as an ordinary stopper; but when applied to jars or vessels filled with material to be preserved the method of using is as follows: The germs referred to can almost invariably be destroyed by boiling or by steam at a temperature of 212° Fahrenheit. The jar or vessel having been filled with the material to be preserved, and which contains more or less water, the cork or stopper is inserted snugly, and the jar and contents are raised to the temperature of boiling water by being placed in a kettle of boiling water, or in any other suitable manner. As soon as steam issues from the hole $c^3$, the interior of the jar, the contents, and the parts of the cork exposed to the action of the steam will be completely sterilized—that is to say, the vitality of all the germs which produce deleterious results will be destroyed, and the filter described prevents any from entering from the external air. The vessel can now be set aside to cool, and the contents will keep as well as if the vessel had been hermetically sealed while the contents were at the temperature of the boiling-point of water, for the air which enters through the filter as the temperature changes will be deprived of all germs before it reaches the interior of the vessel.

In order to prevent the the liquid material from escaping through the filter in case the can is reversed during transportation, it is necessary to be able to isolate it temporarily. This can be effected by making the plug which covers the asbestus flat at the end and long enough to cover the communication between the two holes in the plug. When turned half around it closes the communication with the interior, and the vessel can lie on its side or be inverted. The filter is uninjured by the liquid, and if there is a cock in the bottom of the vessel the contents can be drawn off and the filter used as an air-vent by turning the small screw half-way round, the end of the plug being half cut away.

Having now described my invention, I claim—

1. A cork, stopper, or cover for bottles, jars, &c., provided with a sinuous passage through it, in combination with a filter of asbestus or equivalent air-filtering material arranged within the stopper or cover in said passage, substantially as and for the purpose described.

2. The stopper or cover provided with the sinuous passage through it containing an air-filter, and with the downwardly-inclined outlet-opening from said passage, adapted to drain the filter outwardly, substantially as described.

3. The stopper or cover provided with the sinuous passage through it, and with the air-filter arranged therein, in combination with the plug for closing said passage when required, substantially as and for the purpose described.

In testimony whereof I have hereunto set my hand this 5th day of May, A. D. 1881.

GEO. A. SMYTH.

Witnesses:
RICHARD BLISS, Jr.,
C. E. SMITH.